United States Patent
Abadi et al.

(10) Patent No.: US 10,242,315 B2
(45) Date of Patent: *Mar. 26, 2019

(54) FINITE STATE MACHINE FORMING

(71) Applicant: International Business Machines Corporation, Armonk, NY (US)

(72) Inventors: Aharon Abadi, Eilat (IL); Moria Abadi, Petah-Tikva (IL); Idan Ben-Harrush, Givat Elah (IL)

(73) Assignee: International Business Machines Corporation, Armonk, NY (US)

( * ) Notice: Subject to any disclaimer, the term of this patent is extended or adjusted under 35 U.S.C. 154(b) by 571 days.

This patent is subject to a terminal disclaimer.

(21) Appl. No.: 14/052,778

(22) Filed: Oct. 14, 2013

(65) Prior Publication Data

US 2015/0106303 A1    Apr. 16, 2015

(51) Int. Cl.
    *G06F 15/18*    (2006.01)
    *G06N 5/02*     (2006.01)
    *G06F 9/451*    (2018.01)
    *G06F 9/448*    (2018.01)

(52) U.S. Cl.
    CPC .............. *G06N 5/02* (2013.01); *G06F 9/4498* (2018.02); *G06F 9/451* (2018.02)

(58) Field of Classification Search
    CPC .............. G06N 5/04; G06N 5/02; G06F 8/00
    USPC ..................................................... 706/15, 45
    See application file for complete search history.

(56) References Cited

U.S. PATENT DOCUMENTS

| | | | |
|---|---|---|---|
| 6,853,963 B1 * | 2/2005 | Apfelbaum | G06F 11/3604 703/17 |
| 7,174,361 B1 * | 2/2007 | Paas | G06F 9/4443 709/203 |
| 7,801,885 B1 * | 9/2010 | Verma | G06F 17/30867 707/713 |
| 8,171,438 B2 | 5/2012 | Ward | |
| 8,381,094 B1 | 2/2013 | Prasad et al. | |
| 8,428,893 B2 | 4/2013 | Moore et al. | |
| 8,949,811 B2 * | 2/2015 | Murthy | G06F 8/433 717/157 |
| 2006/0075305 A1 * | 4/2006 | Robinson et al. | 714/38 |
| 2007/0162903 A1 * | 7/2007 | Babb et al. | 717/154 |
| 2011/0125838 A1 * | 5/2011 | Rao | G06Q 30/02 709/203 |
| 2011/0153663 A1 * | 6/2011 | Koren | G06F 17/30964 707/776 |

(Continued)

OTHER PUBLICATIONS

"Codeless Screen-Oriented Programming for Enterprise Mobile Applications", Aharon Abadi, Yael Dubinsky, Andrei Kirshin, Yossi Mesika, Idan Ben-Harrush, Copywright 2010 ACM, pp. 1-6.*

(Continued)

*Primary Examiner* — David R Vincent
(74) *Attorney, Agent, or Firm* — International IP law Group

(57) ABSTRACT

Techniques for representing a finite state machine forming are described herein. The techniques include a method that identifies screens of a computing program. The method may include correlating the identified screens with states of a finite state machine. Events indicating transition between the identified screens may be determined as well as data flow associated with the events. The method may include forming a graph representing the screens, events, and data flow in the finite state machine.

14 Claims, 5 Drawing Sheets

(56) References Cited

U.S. PATENT DOCUMENTS

| | | | |
|---|---|---|---|
| 2012/0209582 A1* | 8/2012 | Purushothaman | 703/13 |
| 2012/0306889 A1 | 12/2012 | Wong et al. | |
| 2013/0246521 A1* | 9/2013 | Schacht et al. | 709/204 |
| 2014/0052433 A1* | 2/2014 | Prasad | G06F 8/74 703/22 |
| 2014/0165035 A1* | 6/2014 | Campbell | G06F 8/72 717/121 |
| 2015/0081449 A1* | 3/2015 | Ge et al. | 705/14.66 |
| 2015/0113501 A1* | 4/2015 | Abadi | G06F 8/38 717/105 |
| 2015/0121336 A1* | 4/2015 | Abadi | G06F 8/72 717/110 |

OTHER PUBLICATIONS

A Survey of Software Refactoring, Tom Mens, IEEE Transactions on Software Engineering, vol. 30, No. 2, Feb. 2004, pp. 126-139.*

"Codeless Screen-Oriented Programming for Enterprise Mobile Applications", Aharon Abadi, Yael Dubinsky, Andrei Kirshin, Yossi Mesika, Idan Ben-Harrush, arxiv.org, Oct. 5, 2013, 1 page.*

"Refactoring with Microsoft Visual Studio 2010", Peter Ritchie, Packt Publishing, Jul. 26, 2010. 4 pages. 2010.*

Bodden et al., "A staged static program analysis to improve the performance of runtime monitoring", ECOOP'07 Proceedings of the 21st European conference on Object-Oriented Programming, pp. 525-549 , 2007.

* cited by examiner

300

500

FINITE STATE MACHINE FORMING

BACKGROUND

The present invention relates to representations of computer programs. More specifically, the present invention relates to representations of mobile applications or web applications as finite state machines with data flow edges. Program analysis plays an important role in a variety of software engineering processes, such as automated code refactoring, compiler optimizations, and program slicing. The internal program representation used by a program analysis algorithm affects the power and efficiency of the analysis.

SUMMARY

In one embodiment, a method for representing a computing program is described herein. The method may include identifying screens of a computing program and correlating the identified screens with states of a finite state machine. Events may be determined, wherein the events indicate a transition between the identified screens. Data flow occurs between the screens. The method may include determining data flow associated with the events. A graph may be formed representing the screens, events, and data flow in the finite state machine.

In another embodiment, a computing device including a storage device and a processor is described herein. The storage device includes instructions that when executed by the processor, cause the computing device to identify screens of a computing program and correlate the identified screens with states of a finite state machine. The instructions may instruct the processor to determine events indicating transition between the identified screens. Data flow may be determined wherein the data flow is associated with the events. The instructions may cause the processor to form a graph representing the screens, events, and data flow in the finite state machine.

In yet another embodiment, a tangible computer-readable medium comprising instructions to direct a processor to carry out operations is described herein. The operations include identifying screens of a computing program and correlating the identified screens with states of a finite state machine. The operations may also include determining events indicating transition between the identified screens and determining data flow associated with the events. The operations may include forming a graph representing the screens, events, and data flow in the finite state machine.

DETAILED DESCRIPTION

The subject matter disclosed herein relates to techniques for providing program analysis including data-flow information. A representation of a computer program may include screens as nodes of a finite state machine. Events may indicate transition between the identified screens, and data flow associated with the events may be represented as edges between the nodes of the finite state machine representation.

Figure 1:
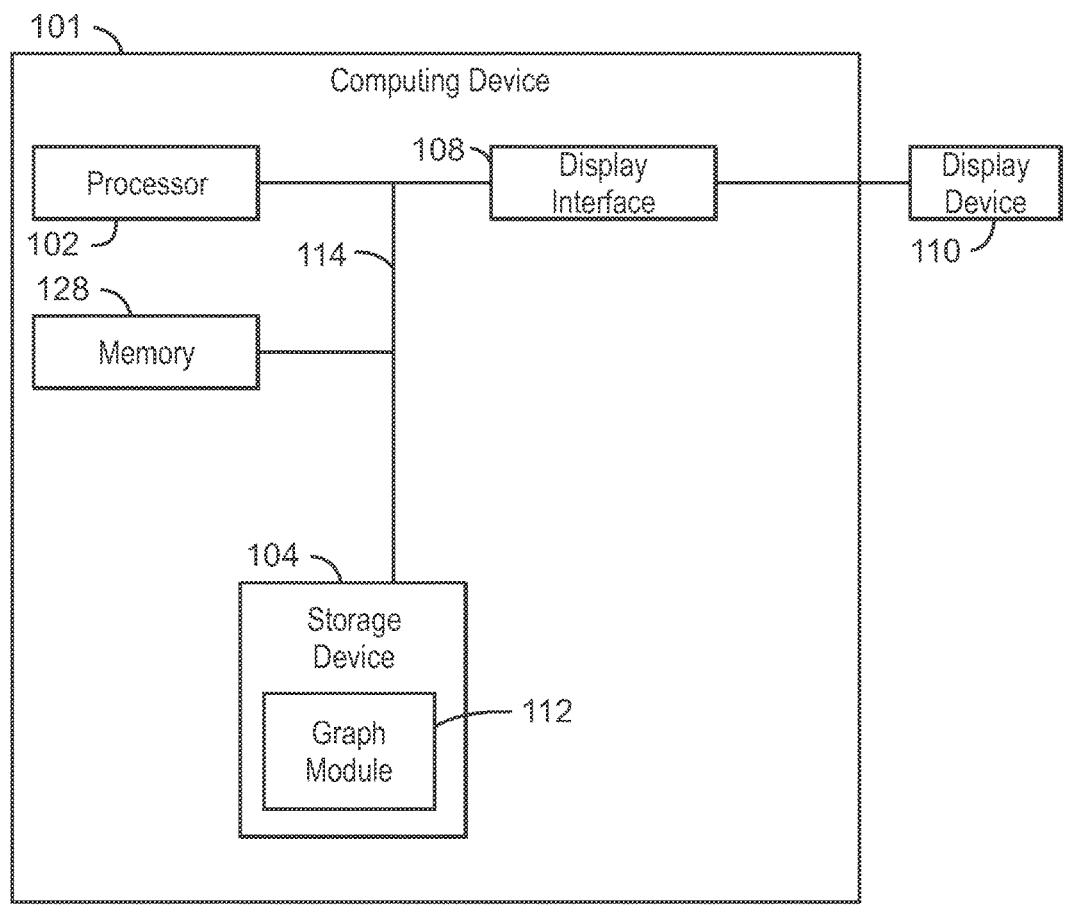
FIG. 1 is a block diagram of a computing system configured to form a graph of a finite state machine.

FIG. 1 is a block diagram of a computing system configured to form a graph of a finite state machine. The computing system 100 may include a computing device 101 having a processor 102, a storage device 104 comprising a non-transitory computer-readable medium, a memory device 106, a display interface 108 communicatively coupled to a display device 110. The storage device 104 may include a graph module 112 configured to form a representation of a computing program. The representation may comprise a finite state machine graph based on screens and dataflow of the computing program as discussed in more detail below. In embodiments, the display interface 108 may enable a user of the computing system 101 to view the graph formed by the graph module 112 via the display device 110. The display device 110 may be an external component to the computing device 101, an integrated component of the computing device 101, or any combination thereof.

The graph module 112 may be logic, at least partially comprising hardware logic. In embodiments, the graph module 112 may be implemented as instructions executable by a processing device, such as the processor 102. The instructions may direct the processor to identify screens of a computing program. The screens are graphical user interface implementations of the computing program. In some embodiments, the screens are configured to be displayed on a mobile device, such as a smart phone, tablet computer, personal computing device and the like. The screen-oriented design of mobile computing programs enables such programs to be represented as a finite state machine. The graph module 112 correlates the identified screens with states of a finite state machine. The instructions of the graph module 112 direct the processor 102 to determine events indicating transition between the identified screens, and determine data flow associated with the events. The graph module 112 may form a graph representing the screens, events, and data flow in the finite state machine.

The extended finite state machine with data flow edges may be used in analysis of the computer program. For example, the extended finite state machine with data flow edges may be used in automated code refactoring, compiler optimization, and program slicing. The representation of the computer program as a finite state machine enables efficient analysis wherein the screens of the computer program are represented as nodes and the dataflow between screens is represented as edges of the graph as discussed in more detail below.

The processor 102 may be a main processor that is adapted to execute the stored instructions. The processor 102 may be a single core processor, a multi-core processor, a computing cluster, or any number of other configurations. The memory unit 106 can include random access memory, read only memory, flash memory, or any other suitable memory systems. The main processor 102 may be connected through a system bus 114 to components including the memory 106, the storage device 104, and the display interface 108.

The block diagram of FIG. 1 is not intended to indicate that the computing device 101 is to include all of the components shown in FIG. 1. Further, the computing device

101 may include any number of additional components not shown in FIG. 1, depending on the details of the specific implementation.

Figure 2:
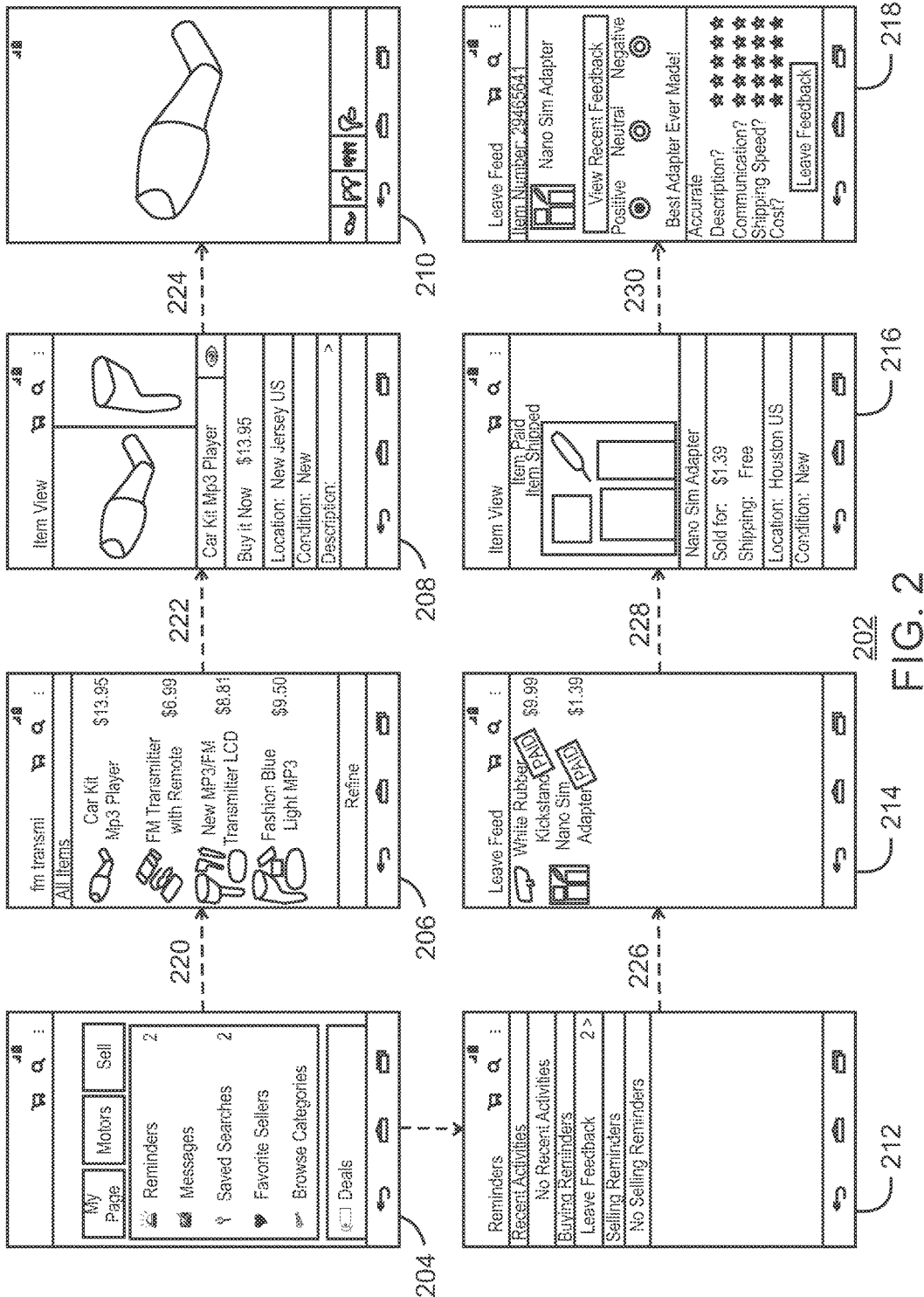
FIG. 2 is an example illustration of screens of a mobile application used to form a finite state machine graph.

FIG. 2 is an example illustration of screens of a mobile application used to form a finite state machine graph. The computer program 202 may include screens 204, 206, 208, 212, 214, 216, 218, wherein control flow of transitions from one screen to another screen are indicated by the dashed arrows 220, 222, 224, 226, 228, 230. The arrows 220, 222, 224, 226, 228, 230 are control flow arrows discussed in more detail below in reference to FIG. 3. As computer programs implemented as mobile applications are increasingly screen-oriented, representations of such computer programs may include the screens as nodes of a finite state machine graph, while dataflow between the screens may be represented as edges of the finite state machine graph.

As illustrated in FIG. 2, the computer program 202 may be a mobile application of an auction website having two general control paths. In a first control path, at screen 204, a search query may be entered and the results of the query may be presented at screen 206. If a user selects an item in the resulting query of screen 206, a selected item is presented at screen 208. If the user selects an image associated with the selected item, a larger image may be presented at screen 210. In a second control path, screen 212 presents reminders when the user selects reminders on screen 204. If the user selects to leave feedback on screen 212, purchased items for which feedback has not yet been submitted is presented on screen 214. When one of the purchases on screen 214 is selected, the chosen item may be displayed at screen 216. If the user selects to leave feedback from the chosen item at screen 216, screen 218 enables the user to leave feedback for the chosen item.

Figure 3:
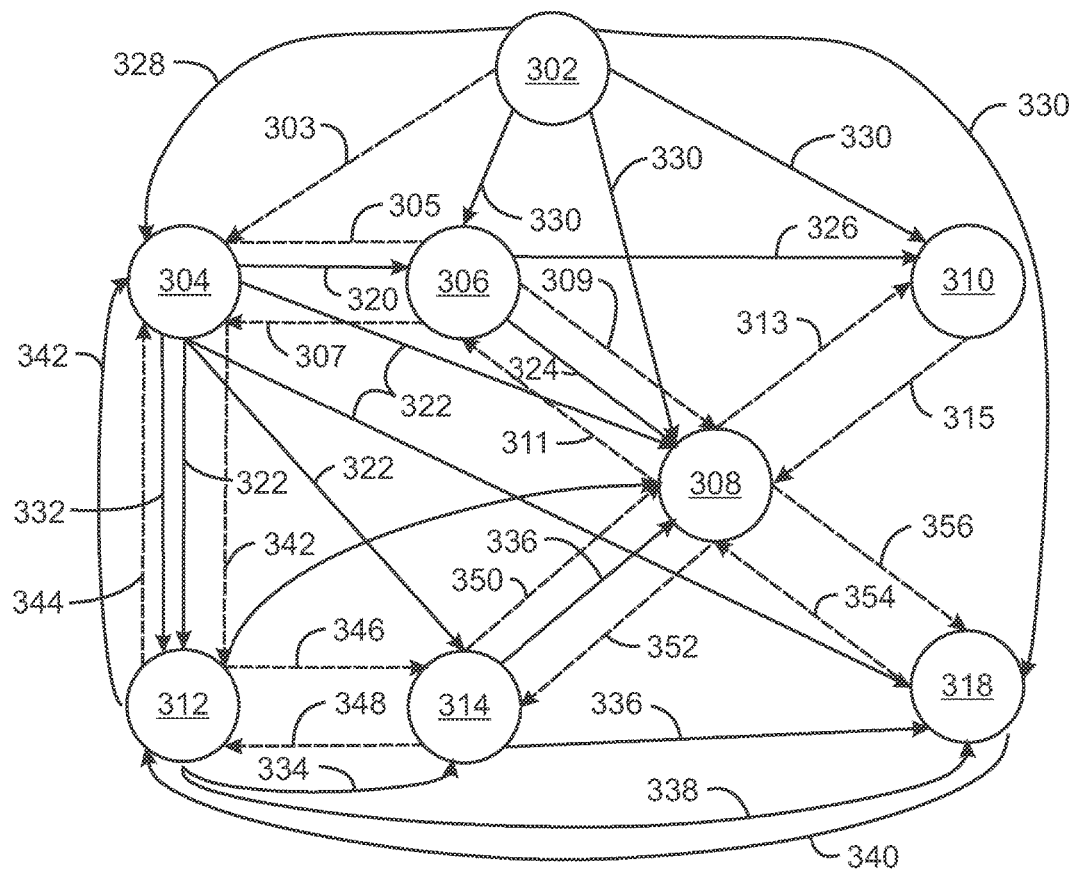
FIG. 3 is a graph formed based on the screens and dataflow of an application.

FIG. 3 is a graph formed based on the screens and dataflow of an application. The graph 300 includes an entry node 302 and screens of a computer program are represented as nodes 304, 306, 308, 310, 312, 314 in a finite state machine graph. The entry node 302 is a virtual initial state of the finite state machine, and does not represent a screen. The dashed arrows represent control flow, and the solid arrows represent data flow. Data flow arrows are labeled with a data item transmitted. For example, a customer identification (cID) may be entered at a screen associated with the node 304, and may flow to nodes that may require the cID, such as nodes 308, 312, 314, and 318, as indicated by the arrows 322. The graph illustrated in FIG. 3 is based on the screens discussed above in reference to FIG. 2. Screen 204 of FIG. 2 is represented as node 304 in FIG. 3. Screen 206 of FIG. 2 is represented as node 306 in FIG. 3. Screen 210 of FIG. 2 is represented as node 310 in FIG. 3. Screen 212 of FIG. 2 is represented as node 312 in FIG. 3, and screen 214 of FIG. 2 is represented as node 314 in FIG. 3. Screen 218 of FIG. 2 is represented as node 318 in FIG. 3. In embodiments, the screens 208 and 216 of FIG. 2 may be implemented using the same or similar code, and are combined as node 308 in FIG. 3. Although the graph 300 illustrated in FIG. 3 is implemented to represent the screens and data flow between the screens discussed above in reference to FIG. 2, other computer programs may be implemented by representing the screens as nodes and data flow as edges of a finite state machine graph is a similar manner as described herein.

As illustrated in FIG. 3, each of the screens is represented as a node indicating a state in the graph 300. Control flow between screens indicated by the dashed arrows 220, 222, 224, 226, 228, 230 in FIG. 3, are indicated as dashed arrows in in the finite state machine graph 300 of FIG. 3. Data flow is defined by the state, such as the options of a given screen, and data flow associated with a given option are represented as solid edges indicated by solid arrows in the finite state machine graph 300 of FIG. 3. For example, if a variable is selected in screen 204 and subsequently used in screen 206, a data flow edge is added from node 304 to node 306 in the graph 300.

Initially, at screen 204 of FIG. 2, a user may attempt to login. An entry node 302 may provide data from a customer database for the user based on the login as indicated by the arrow 328. The dashed arrow 303 indicates a control flow from a dummy state 302. If a user enters a query at screen 204 of FIG. 2 the control flow is indicated by dashed arrow 305. If the user selects to back to screen 204 of FIG. 2, a control flow edge is indicated by the dashed arrow 307. Upon entering a query, data indicating a search string associated with the query will flow from node 304 to node 306 as illustrated by arrow 320. The user may select a specific item from screen 206 of FIG. 2 and the event is indicated by the dashed arrow 309 while the event wherein a user selects to go back from screen 208 in FIG. 2 is indicated by the dashed arrow 311. When the user selects a specific item from screen 206 of FIG. 2, data indicating the specific item selected may flow from node 306 to node 308, as indicated by arrow 324.

A user may select a picture of a selected item at screen 208 of FIG. 2, as indicated by dashed arrow 313. The user may select to go back from screen 210 of FIG. 2 and return to screen 208 of FIG. 2 as indicated by the dashed line 315. If at screen 208 of FIG. 2 the user selects the picture of the selected item at screen 208 of FIG. 2, data indicating the specific item selected may flow from 306 to node 310 as indicated by arrow 326.

As discussed above, a user may select to leave feedback at screen 204 of FIG. 2, and this control flow is indicated by the dashed arrow 342. The user may select to go back from the screen 212 of FIG. 2, as indicated by the dashed arrow 344. To leave feedback, a cID is required at nodes 312, 314, 318, and 308. If a user logs in using a cID on screen 204 of FIG. 2, data indicating the cID may flow from node 304 to any other node, such as nodes 308, 312, 314, and 318 that may require the user identification as indicated by arrows 322. Further, if at screen 204 of FIG. 2 a user selects to leave feedback, data from the customer database indicating specific items for which the user has not left feedback may flow from the node 304 to the node 312 as indicated by the arrow 332.

An event may include a user selecting at screen 212 of FIG. 2 to leave feedback for recently purchased items, as indicated by the dashed arrow 346. The dashed arrow 348 indicates that an event including the user selecting to return to screen 212 from screen 214 of FIG. 2. Similar events are indicated by the arrows 350, 352, between nodes 314 and 308, and dashed arrows 354 and 356 between nodes 308 and 318.

If at screen 212 of FIG. 2 a user selects to leave feedback for recently purchased items, data from the customer database may flow from the node 312 to the node 314 as indicated by the arrow 334. If at screen 214 of FIG. 2 the user a selects a recently purchased item to leave feedback for, data indicating the selected item will flow from the node 314 to the node 308 and node 318, as indicated by the arrows 336, as well as data from the customer database from node 312 to node 318 as indicated by the arrow 338. Once feedback has been entered at screen 218 of FIG. 2, data indicating an update to the customer database will flow from node 318 to node 312 as indicated by the arrow 340, and from node 312 to node 304 as indicated by arrow 342.

The entry node 302 may be a server-side node enabling access to an item database and a customer database. The item data base may be needed at each of nodes 306, 308, 310, 318. The data flow of item database data from entry node 302 to each of the nodes 306, 308, 310, and 318 as indicated by the arrows 330.

As discussed above, the finite state machine graph 300 is a representation of a computing program. The representation illustrated in FIG. 3 may be used for analysis of the computing program.

Figure 4:
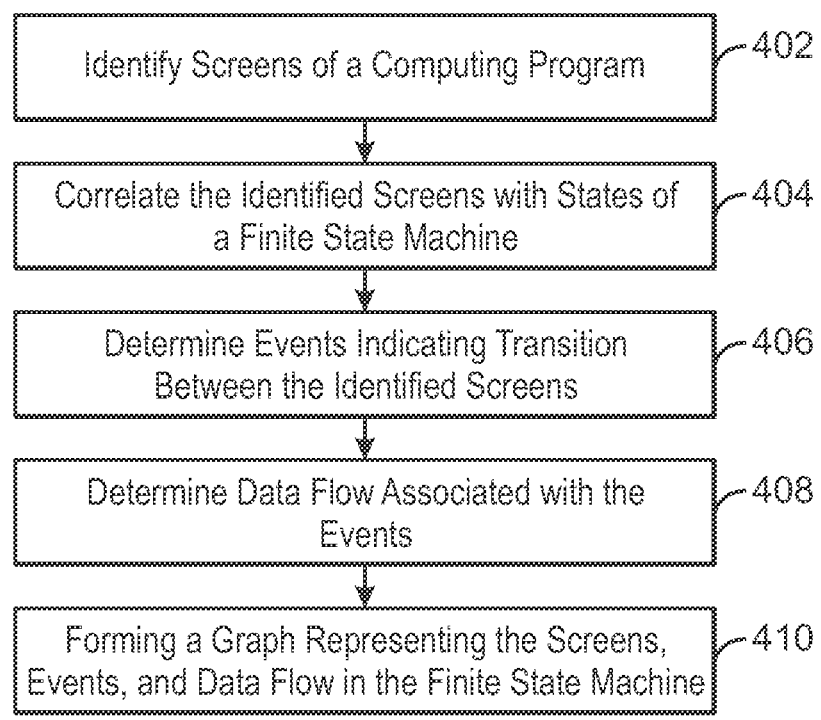
FIG. 4 is a block diagram illustrating a method of forming a graph of a finite state machine.

FIG. 4 is a block diagram illustrating a method of forming a graph of a finite state machine. The method 400 may include identifying screens of a computing program at block 402, and correlating the identified screens with states of a finite state machine at block 404. At block 406, events indicating transition between the identified screens are determined. At block 408, data flow associated with the events is determined. A graph is formed at block 410 representing the screens, events and data flow in the finite state machine.

In embodiments, the identified screens are represented as nodes in the graph and data flow is represented as edges of the graph. As discussed above in reference to FIG. 3, events may be represented by dashed edges of the graph. The events may be result of user actions, incoming communications such as a wireless signal, a global positioning sensor signal, server-related data pushes, or any combination of user actions and incoming communications.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
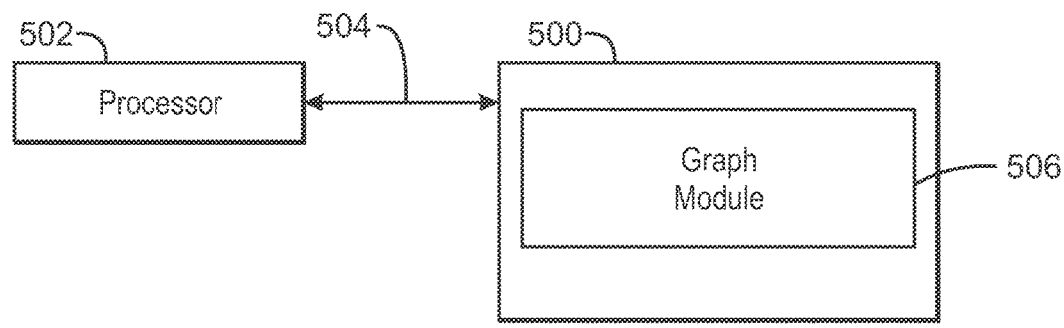
FIG. 5 is a block diagram depicting an example of a tangible, non-transitory computer-readable medium that can be used to form a graph of a finite state machine.

FIG. 5 is a block diagram depicting an example of a tangible, non-transitory computer-readable medium that can be used to form a graph of a finite state machine. The tangible, non-transitory, computer-readable medium 500 may be accessed by a processor 502 over a computer bus 504. Furthermore, the tangible, non-transitory, computer-readable medium 500 may include computer-executable instructions to direct the processor 502 to perform the steps of the current method.

The various software components discussed herein may be stored on the tangible, non-transitory, computer-readable medium 500, as indicated in FIG. 5. For example, a graph module 506 may be configured to identify screens of a computing program and correlate the identified screens with states of a finite state machine. The graph module 506 may determine events indicating transition between the identified screens, and determine data flow associated with the events. The graph module 506 may form a graph representing the screens, events, and data flow in the finite state machine.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   identifying screens of a computing program;
   correlating the identified screens with states of a finite state machine;
   determining events indicating transitions between the identified screens, the identified screens comprising at least a first screen to detect a customer identification number, wherein at least one of the events indicating at least one of the transitions comprises a combination of a user action and an incoming communication from a global positioning sensor signal;
   determining data flow between the screens associated with the transitions, the data flow comprising the customer identification number that enables at least a second screen to detect feedback;
   forming a finite state machine graph representing the screens, events, and data flow in the finite state machine, the finite state machine graph comprising nodes corresponding to the identified screens, edges corresponding to the data flow between the screens associated with the transitions, and an entry server-side node enabling each node of the finite state machine to access an item database and a customer database, wherein the customer database comprises data indicating specific items for which a user has not left feedback, and wherein a first code for one of the identified screens related to displaying a picture of a selected item from a query and a second code for one of the identified screens related to displaying a chosen item corresponding to a purchase are combined into a single node of the finite state machine graph, wherein the combined single node comprises a shared functionality of displaying the picture of the selected item of the first code and displaying the chosen item of the second code, and wherein the first code or the second code in the single node of the finite state machine graph is executed in response to detecting the event indicating the at least one transition comprising the combination of the user action and the incoming communication from the global positioning sensor signal; and
   modifying a compiler to perform automated code refactoring based on the finite state machine graph.

2. The method of claim 1, wherein the computing program is to be implemented on a mobile computing device.

3. The method of claim 1, comprising analyzing the finite state machine graph representing the screens, events, and data flow by an analytical module.

4. The method of claim 3, wherein the analyzing comprises:
   optimization; and
   validation.

5. The method of claim 1, wherein the screens are displayed on a graphical user interface of a computing device.

6. A computing device, comprising:
   a storage device;
   a processor;
   the storage device having instructions that when executed by the processor, cause the computing device to:
   identify screens of a computing program;
   correlate the identified screens with states of a finite state machine;
   determine events indicating transitions between the identified screens, the identified screens comprising at least a first screen to detect a customer identification number, wherein at least one of the events indicating at least one of the transitions comprises a combination of a user action and an incoming communication from a global positioning sensor signal;
   determine data flow associated with the transitions, the data flow comprising the customer identification number that enables at least a second screen to detect feedback;
   form a finite state machine graph representing the screens, events, and data flow in the finite state machine, the finite state machine graph comprising nodes corresponding to the identified screens, edges corresponding to the data flow between the screens associated with the transitions, and an entry server-side node enabling each node of the finite state machine to access an item database and a customer database, wherein the customer database comprises data indicating specific items for which a user has not left feedback, and wherein a first code for one of the identified screens related to displaying a picture of a selected item from a query and a second code for one of the identified screens related to displaying a chosen item corresponding to a purchase are combined into a single node of the finite state machine graph, wherein the combined single node comprises a shared functionality of displaying the picture of the selected item of the first code and displaying the chosen item of the second code, and wherein the first code or the second code in the single node of the finite state machine graph is executed in response to detecting the event indicating the at least one transition comprising the combination of the user action and the incoming communication from the global positioning sensor signal; and modify a compiler to perform automated code refactoring based on the finite state machine graph.

7. The computing device of claim 6, wherein the computing program is to be implemented on a mobile computing device.

8. The computing device of claim 6, comprising analyzing the finite state machine graph representing the screens, events, and data flow by an analytical module.

9. The computing device of claim 8, wherein the analyzing comprises:
optimization; and
validation.

10. The computing device of claim 6, wherein the screens are displayed on a graphical user interface of a computing device.

11. A non-transitory computer readable storage medium for forming a finite state machine having program code embodied therewith, the program code executable by a processor to perform a method comprising:
identifying, by the processor, screens of a computing program;
correlating, by the processor, the identified screens with states of a finite state machine;
determining, by the processor, events indicating transitions between the identified screens, the identified screens comprising at least a first screen to detect a customer identification number, wherein at least one of the events indicating at least one of the transitions comprises a combination of a user action and an incoming communication from a global positioning sensor signal;

determining, by the processor, data flow associated with the transitions, the data flow comprising the customer identification number that enables at least a second screen to detect feedback;

forming, by the processor, a finite state machine graph representing the screens, events, and data flow in the finite state machine, the finite state machine graph comprising nodes corresponding to the identified screens, edges corresponding to the data flow between the screens associated with the transitions, and an entry server-side node enabling each node of the finite state machine to access an item database and a customer database, wherein the customer database comprises data indicating specific items for which a user has not left feedback, and wherein a first code for one of the identified screens related to displaying a picture of a selected item from a query and a second code for one of the identified screens related to displaying a chosen item corresponding to a purchase are combined into a single node of the finite state machine graph, wherein the combined single node comprises a shared functionality of displaying the picture of the selected item of the first code and displaying the chosen item of the second code, and wherein the first code or the second code in the single node of the finite state machine graph is executed in response to detecting the event indicating the at least one transition comprising the combination of the user action and the incoming communication from the global positioning sensor signal; and modifying a compiler to perform automated code refactoring based on the finite state machine graph.

12. The non-transitory computer readable storage medium of claim 11, wherein the computing program is to be implemented on a mobile computing device.

13. The non-transitory computer readable storage medium of claim 11, comprising analyzing the graph representing the screens, events, and data flow by an analytical module wherein the analyzing comprises:
optimization; and
validation.

14. The non-transitory computer readable storage medium of claim 11, wherein the screens are displayed on a graphical user interface of a computing device.

* * * * *